Nov. 23, 1971 A. B. SCOTT 3,621,859
JET DEFLECTION CONTROL SYSTEMS
Filed June 25, 1969 3 Sheets-Sheet 1

United States Patent Office 3,621,859
Patented Nov. 23, 1971

3,621,859
JET DEFLECTION CONTROL SYSTEMS
Athelstane Bodley Scott, Drayton, Middlesex, England, assignor to National Research Development Corporation, London, England
Filed June 25, 1969, Ser. No. 836,505
Claims priority, application Great Britain, June 27, 1968, 30,668/68
Int. Cl. F15c 1/04
U.S. Cl. 137—81.5         6 Claims

ABSTRACT OF THE DISCLOSURE

The present invention concerns a jet deflection control system for use with a "jet flap" type of control surface, which requires a high momentum in the output jet formed and controlled as near to the point of operation as possible, the control being produced by splitting a primary jet into two subsidiary jets which are normally convergent with deflection being effected by controlling at least one of the subsidiary jets to modify the normal convergence.

---

The present invention is concerned with the design of a fluid control system suitable for use with a "jet flap" type of control surface.

This type of control requires a high momentum in the output jet and, in the interests of efficiency and rapid response to control signals, it is desirable to form the output jet and to control it as near to the point of operation as possible.

This requirement necessitates the fitting of the control system into the trailing edge of the control surface. In order to achieve this, the element must be compact and of a suitable shape.

Under conditions of no control signal the output jet must issue from the rear of the control surface and be directed along the major axis of the control surface. When control is applied, the output jet must be deflected through a wide angle in order to achieve reasonable deflection forces from the control surface. Accordingly the present invention comprises a jet deflection control system in which a primary jet is split into two subsidiary jets which are normally convergent with deflection being effected by controlling at least one of the subsidiary jets to modify the normal convergence.

Three similar types of control system are described below. The first is shown in FIG. 1 where 1 is the input for the operating fluid forming the primary jet, 2 and 3 form two subsidiary jets, 4 and 5 are the control jets with 8 and 9 as their supply channels, and 6 and 7 are deflector plates.

FIG. 2 shows the operation with no control. The primary jet splits into two subsidiary jets which attach themselves to the surfaces of the central core 10 and converge at the tip to form a single output jet along the axis of the element.

FIG. 3 shows the operation when the upper control jet is operating. This causes the upper subsidiary jet to break away from the core and strike the upper deflector plate, which deflects it through an angle of about 50°. The lower subsidiary jet now no longer reacts with the upper output jet and leaves the core at the angle of the core tip (i.e. 50°). The two subsidiary jets then combine to form one jet at 50° to the axis.

FIG. 4 shows the function similar to FIG. 3 but with the lower control jet operative.

These figures show the limit of operation, but FIG. 5 shows how a degree of proportionality can be achieved by siting the control jet well down stream and controlling the point of breakaway of each subsidiary jet. Each subsidiary jet can then be split at the edge of the deflector leaving part of the subsidiary jet to interact with the other subsidiary jet. A series of deflectors at varying angles may also be used.

The second type of control system is shown in FIG. 6 where 1 is the input for the operating fluid forming the primary jet, 2 and 3 are the subsidiary jets, 4 and 5 are the control jets with 8 and 9 as their supply channels, 6 and 7 are deflector plates forming enclosed channels with the central core 10.

Figure 1:
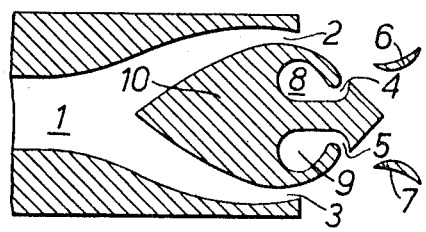
Figure 2:
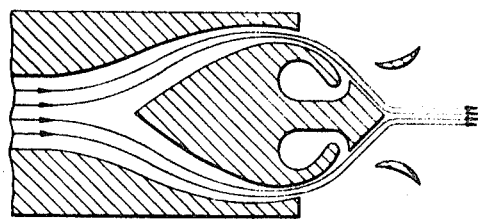
Figure 3:
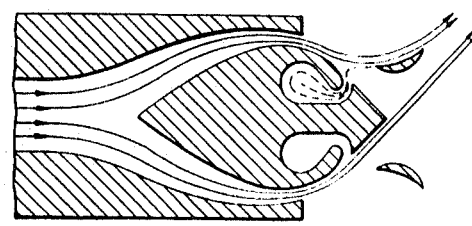
Figure 4:
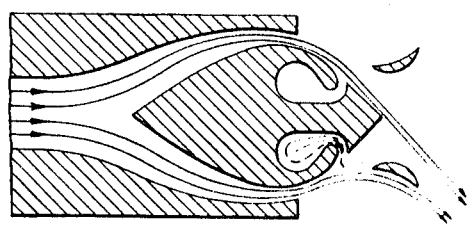
Figure 5:
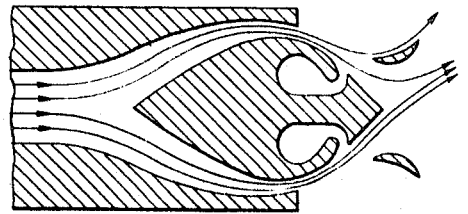
Figure 6:
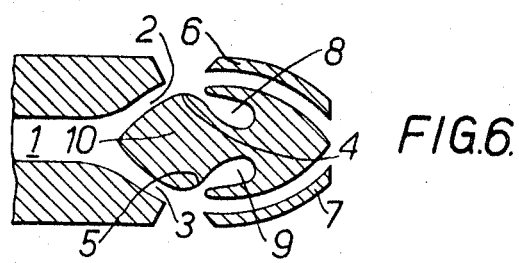
Figure 7:
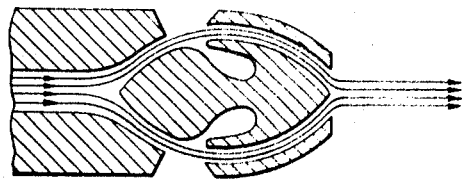
FIG. 7 shows the operation with no control jet. The two subsidiary jets attach themselves to the centre core and pass through the channels formed by the deflector plates 6 and 7 with the central core, the two subsidiary jets converge at the exit forming a jet parallel with the axis.
Figure 8:
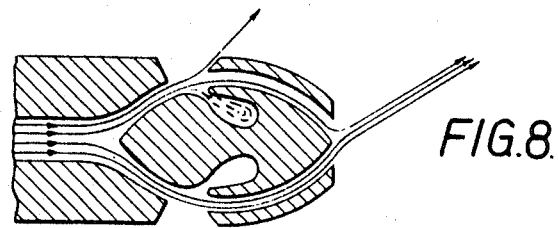
FIG. 8 shows the effect of a low velocity control jet from the upper control. The upper subsidiary jet is partially deflected and is divided by the deflector plate 6, part of the jet issuing from the side and part flowing through the upper channel and interacting with the lower subsidiary jet at the exit.
Figure 9:
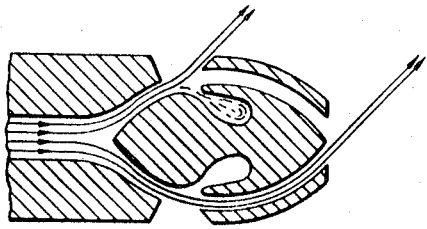
FIG. 9 shows the effect of full control, the whole of the upper subsidiary jet being deflected to one side and the lower subsidiary jet issuing from the exit at the core tip angle.
Figure 10:
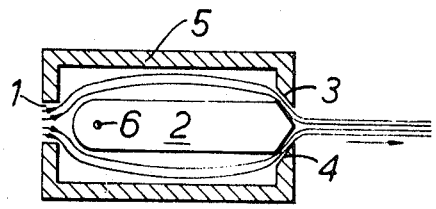

A third type of control system is shown in FIG. 10 in which 5 is an outer casing which has bevelled edges at 3 and 4 forming slots with the bevelled end of the rotor or moving part 2 pivoted about its axis 6. In FIG. 10 the rotor is centrally positioned so that slots 3 and 4 are equal in width. Under this condition, the fluid entering at 1 flows equally through slots 3 and 4 and emerges to form two subsidiary jets which converge at the exit forming a jet parallel with the axis.

Figure 11:
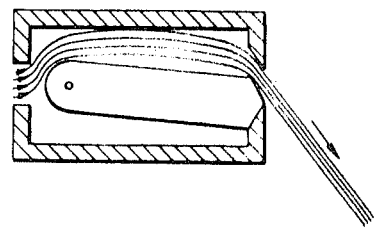

FIG. 11 shows the rotor fully turned to close the bottom slot 4. In this condition all the fluid exits from the top slot in a single jet at an angle determined by the bevelled edges of the outer casing and of the end of the rotor.

Figure 12:
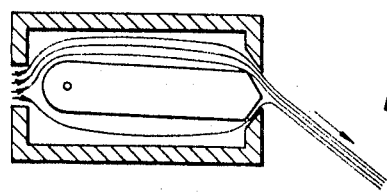

FIG. 12 shows the rotor in an intermediate position between conditions in FIGS. 10 and 11 with more fluid coming out of the top slot than out of the bottom one. In this case the resultant momentum of the two jets forms a jet at an intermediate angle between the axial jet of FIG. 10 and the fully deflected jet of FIG. 11.

Figure 13:
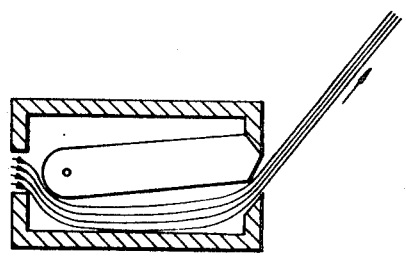

FIG. 13 shows the top slot fully closed and the output jet deflected fully upwards.

The jet may be smoothly swung from one extreme to the other by moving the rotor from one side to the other. The rotor could equally well be a sliding member moving in a plane at right angles to the axis. The total cross section of the combined jets remains substantially constant as the rotor is moved, giving an output jet of constant momentum but varying angle of deflection.

We claim:
1. A jet deflection control system in which a primary jet is split into two subsidiary jets which are normally convergent, with deflection being effected by controlling at least one of the subsidiary jets to modify the normal convergence, and including deflector plates to assist in deflecting the subsidiary jets.

2. A jet deflection control system as claimed in claim 1 in which the primary jet is split into two subsidiary jets by means of a central core which is convergent on the downstream side of the core.

3. A jet deflection control system as claimed in claim 2 in which control of the subsidiary jets is produced by the impingement of control jets at an angle thereto to produce deflection thereof.

4. A jet deflection control system as claimed in claim 3 in which the supply channels for the controls jets are located in the central core.

5. A jet deflection control system as claimed in claim 4 in which the deflector plates are positioned relative to the central core to form enclosed channels for the subsidiary jets, the control jets being positioned upstream of the deflector plates.

6. A jet deflection control system in which the primary jet is split into two subsidiary jets, which are normally convergent, by a movable dividing member having bevelled edges on its downstream side which co-operate with bevelled edges of an exit opening for the fluid to form slots, with deflection being effected by moving the dividing member to modify the normal convergence of the subsidiary jets.

References Cited
UNITED STATES PATENTS

| | | | |
|---|---|---|---|
| 3,080,886 | 3/1966 | Severson | 137—815 |
| 3,266,512 | 8/1966 | Turick | 137—815 |
| 3,276,463 | 10/1966 | Bowles | 137—815 |
| 3,326,227 | 6/1967 | Mitchell | 137—815 |
| 3,366,131 | 1/1968 | Swartz | 137—815 |
| 3,416,551 | 12/1968 | Kinner | 137—815 |
| 3,435,837 | 4/1969 | Sher | 137—815 |
| 3,447,553 | 6/1969 | Campagnudo et al. | 137—815 |
| 3,452,768 | 7/1969 | Sieracki | 137—815 X |
| 3,487,845 | 1/1970 | Stern | 137—815 |
| 3,495,253 | 2/1970 | Richards | 137—815 |

SAMUEL SCOTT, Primary Examiner